大专利 Office 2,987,074
Patented June 6, 1961

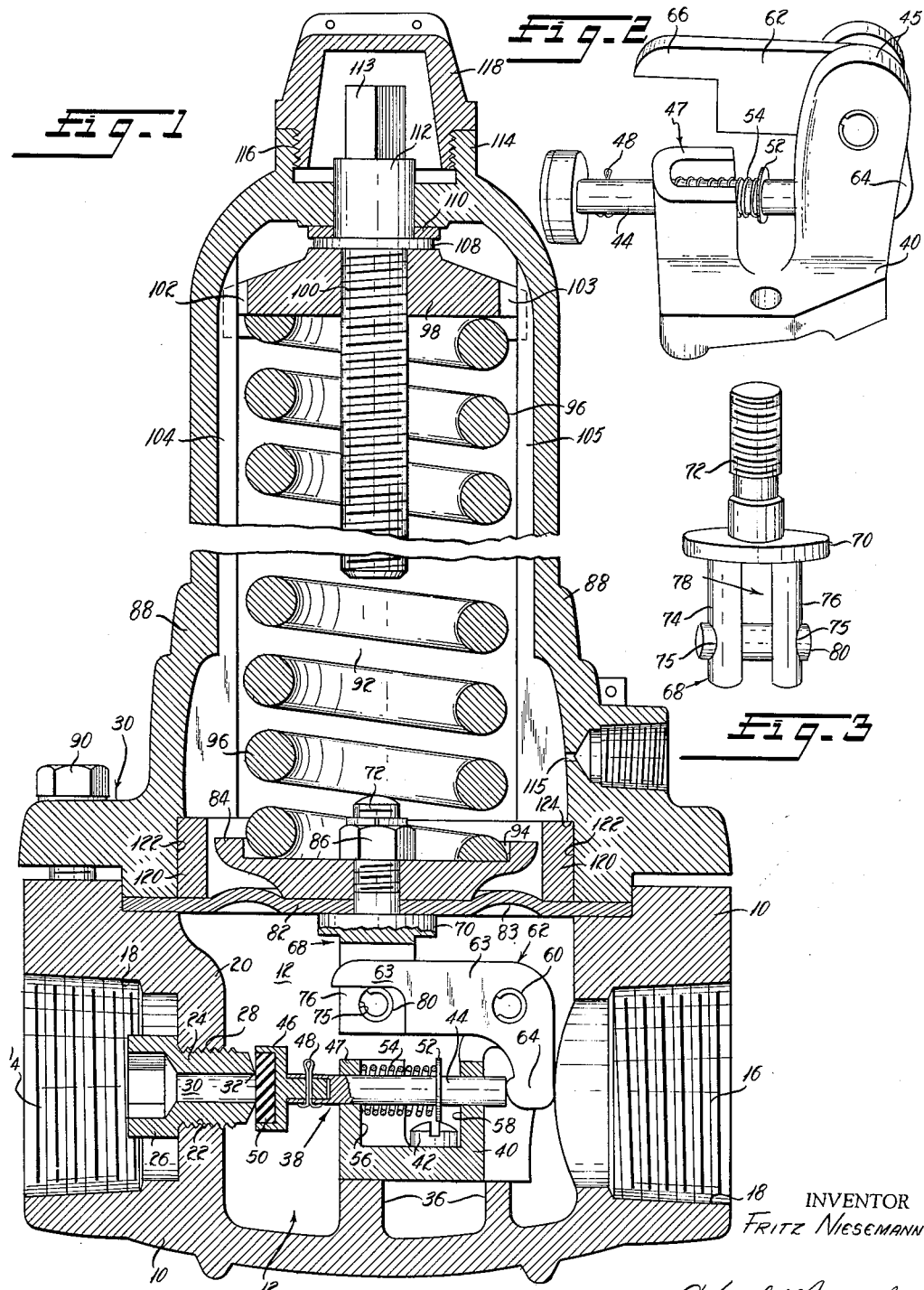

2,987,074
FLUID PRESSURE REGULATOR
Fritz Niesemann, Pittsburgh, Pa., assignor to Rockwell Manufacturing Company, Pittsburgh, Pa., a corporation of Pennsylvania
Filed Jan. 7, 1957, Ser. No. 632,879
6 Claims. (Cl. 137—505.46)

This invention relates to high pressure fluid regulators, and in particular to improvements therein which make the regulator quickly adaptable to varying service conditions.

Fluid pressure valves of the type to which this invention relates are normally installed in a high pressure gas line to reduce the pressure from the supply pressure to a lower value which is maintained substantially constant irrespective of fluctuations in supply pressure due to varying demands upon the supply line or due to variations in the volume of gas required to be delivered by the regulator. The regulators heretofore used in high pressure systems having outlet pressures ranging up to 400 p.s.i. have been designed for specific ranges which require a regulator designed for each particular range, or one which is not readily adaptable to varying ranges. The mechanical linkage and other parts usually found in high pressure regulators are relatively complex and made to close tolerances as compared with regulators designed for lower pressure ranges.

An object of this invention is to provide a rugged high pressure fluid regulator having a novel mechanical linkage between a diaphragm responsive to fluid pressure and a valve for stopping fluid flow when an excess fluid pressure is reached, the linkage being suitable for use in regulators accommodating a wide range of fluid pressures.

Another object of this invention is to provide a versatile high pressure fluid regulator having readily interchangeable and removable parts whereby the regulator may be quickly adapted to accommodate varying service conditions.

Other objects of the invention will, in part, be obvious, and will, in part, appear hereinafter.

For a fuller understanding of the nature and objects of the invention, reference should be had to the following detailed description and drawing, in which:

FIGURE 1 is a vertical sectional view through the center of a fluid pressure regulator illustrating the principles of the invention;

FIGURE 2 is a perspective view of the support member on which the valve stem and bell crank are mounted; and FIGURE 3 is a perspective view of the diaphragm stem.

Referring to FIGURE 1 of the drawing, there is illustrated a pressure regulator having a lower casing 10 in which there is disposed a diaphragm chamber 12. Connected to the chamber 12 is a fluid inlet 14 in axial alignment with an outlet 16. Both the inlet and outlet have pipe threads 18. At the inner end of the inlet 14 is a wall 20 with a central threaded bore 22. Threaded into the bore 22 is an orifice member 24. Orifice member 24 has an enlarged circular end 26 which is centrally broached at 28 to allow insertion of an Allen type wrench. Also, a through bore or orifice is provided at 30. The inner end of the orifice member 24 within the diaphragm chamber 12 is flared inwardly from its outer periphery to provide a valve seat 32.

Within the diaphragm chamber 12 is an integrally cast boss 36. Mounted upon the boss 36 is a valve assembly which is indicated generally as 38. A support member 40 is fastened securely to the boss 36 by means of two machine screws 42. An extended valve stem 44 is mounted for sliding movement through a U-shaped support 47 on the support member 40. A valve 46 is held by means of a cotter pin 48 at one end of the extended valve stem. Suitable seating material is provided at 50 such as leather or molded nylon and the like. An annular groove near the other end of the valve stem 44 positions a snap ring 52 which acts as an abutment for a coil spring 54. The other abutment for the spring 54 is provided by the internal wall 56 of the support member 40. Thus, the valve assembly 38 is biased by the spring 54 into the open position. It can be seen that sliding movement of the valve stem 44 is limited at one extreme by contact between the valve 46 and valve seat 32 and at the other extreme by contact between the snap ring 52 and the other internal wall 58 of the support member 40.

A pin 60 is pressed into a pair of upper extensions 45 of the support member 40 as shown in FIGURE 2. Pivotably mounted on the pin 60 is an L-shaped bell crank 62 having a long leg 63 and a short leg 64 which are substantially at a right angle to each other. A bore 61 through the bell crank 62, through which pin 60 extends, is positioned substantially where legs 63 and 64 intersect. The short leg 64 of the L-shaped bell crank 62 abuts against the end of the valve stem 44. The long leg 63 of the bell crank 62 has a reduced extension 66 which permits the crank to be loosely engaged by a diaphragm stem 68.

The diaphragm stem 68 shown in perspective in FIGURE 3 of the drawing, comprises an annular shoulder 70 with a threaded portion 72 extending upwardly therefrom, and a bifurcated portion forming two downwardly extending legs 74 and 76. The legs 74 and 76 define a slot 78 between their inner surfaces. Two axially aligned holes 75 drilled in the legs near their ends have a pin 80 pressed therein. The reduced extension 66 of the bell crank 62 extends into the slot 78 and is held in contact with pin 80 by the action of the valve spring 54 which, through the valve stem 44, applies a counterclockwise movement to the bell crank 62, tending to pivot it about the pin 60 to hold extension 66 in abutting engagement with pin 80.

The upwardly extending threaded portion 72 of the diaphragm stem 68 passes through central circular openings in a diaphragm 82 and a diaphragm pan 84. The diaphragm 82 and the diaphragm pan 84 are securely clamped between the annular shoulder 70 of the diaphragm stem 68 and a lock nut 86 at the upper end of threaded portion 72. The outer periphery of the diaphragm 82 is tightly and sealingly clamped between the lower casing 10 and an upper casing 88, the two casings being held together by means of six cap screws 90. The upper casing 88 provides a large control chamber 92, the function of which will be described hereinafter. Thus, the diaphragm 82 seals off the diaphragm chamber 12 from the control chamber 92 in the upper casing 88.

The upper surface of the diaphragm pan 84 has been cut away to provide a recess 94 for one end of a diaphragm spring 96. The other end of the spring 96 abuts against an adjustable ferrule 98 near the top of the upper casing 88. The ferrule 98 is threaded on an adjustment shaft 100 which extends downwardly through the center of the control chamber 92. The ferrule 98 has two diametrically opposed slots 102 and 103 milled into its outer periphery. These slots cooperate with two similarly positioned ribs 104 and 105 respectively, in the upper casing 88 to prevent the ferrule from turning. The shaft 100 has an annular shoulder 108 which bears against a disc bearing 110 at the top of the control chamber 92. At the top of the casing 88, a circular aperture is provided through which passes an extension 112 of the shaft 100. The upper end 113 of the extension has been shaped to allow the use of a wrench to turn the shaft 100. When the threaded shaft 100 is turned, the ferrule 98 will be made to move upward or downward to adjust the tension of spring 96.

The top of the casing 88 is formed with an annular wall portion 114 which has an internal thread 116 to receive a hollow protective cap 118. The protective cap 118 guards the spring adjustment shaft from damage such as bending or breaking and makes it possible to bury the regulator underground. Vent 115 is piped above ground when the regulator is buried so control chamber 92 will always be at atmospheric pressure.

As described, this regulator will operate accurately over a comparatively wide range of inlet and outlet pressures and capacities. By offering to the customer four difference inlet orifice sizes, of ⅜", ¼", ³⁄₁₆" and ⅛", many different capacities between 280 cu. ft. per hour to approximately 80,000 cu. ft. per hour can be obtained. The range of outlet pressures, regardless of orifice size, is from 0 to approximately 250 p.s.i.

It is necessary to use four springs to cover this range of outlet pressures. These springs are approximately the same in many respects. They are all easily fitted into the control chamber 92 of upper casing 88. The slopes of their deflection versus load curves are nearly the same for their respective load ranges. They are all standard springs which can be purchased at a reasonably low price. To purchase a fifth spring which would be suitable for a higher outlet pressure range of from 250 to 400 p.s.i. and which would be approximately the same as the others in these respects, would be very costly. This is because the fifth spring would have to be hot wound and heat-treated. Therefore, it is desirable to attain this higher range of outlet pressures without the necessity of using springs stronger than those commercially available. To accomplish this, the fluid pressure responsive area of the diaphragm 82 is reduced by a reducing ring 120.

The principle of the reducing ring is explained as follows: The outlet pressure, $P_D$, in the diaphragm chamber 12 acts upwardly on the diaphragm 82, tending to close the valve 46. (Note: $P_D$ is slightly greater than outlet pressure since a pressure loss occurs when gas leaves the diaphragm chamber 12 and enters outlet 16.) The actual force, $F_D$ exerted by diaphragm 82 against spring 96 can be found by using the following formula:

1. $$P_D \times A_{eff} = F_D$$

where $A_{eff}$ is the effective area of the diaphragm. The $A_{eff}$ of the diaphragm is found as follows:

2. $$A_{eff} = (\pi) \times (R_{eff})^2$$

where $R_{eff}$ is the effective radius measured from the center of the diaphragm to the topmost point of the inverted trough portion 83 of the diaphragm 82.

If the force $F_D$ is greater than the resisting force $F_S$ of the spring 96, the valve will start to close and conversely, if $F_D$ is less than $F_S$, the valve will start to open. Thus, it can be seen that the necessary range of $F_S$ is dependent on the range of $F_D$ which in turn is dependent on the range of the variable $P_D$. If it is desired to increase the range of outlet pressures without use of a stronger spring, it is necessary to reduce the effective diaphragm area in an amount corresponding to the increase in the outlet pressure range to maintain the total force $F_D$ acting against the diaphragm constant. The reduction of $A_{eff}$ is accomplished by the use of the reducer ring 120.

In the interior wall of the upper casing 88, an annular groove 122 is machined just below the end of the ribs 104 and 105 and immediately above the diaphragm 82 and forms an annular shoulder 124 with the inner surface of casing 88. The reducer ring 120 has an inside diameter slightly greater than the diameter of the diaphragm pan 84 and an outside diameter equal to the diameter of the annular groove 122.

When it is desired to have a higher range of outlet pressures in the order of 200–400 p.s.i., the cap screws 90 are unscrewed and the upper casing 88 is removed. The reducer ring 120 is put into position on top of the diaphragm 82 and the regulator is reassembled. Thus, the reducer ring is supported by the diaphragm 82 and held in position by the walls of the groove 122 and the bottom of the ribs 104 and 105.

The fluid pressure $P_D$, which acts upon the diaphragm 82 directly beneath the ring 120, will be absorbed by the ring and the upper casing 88. Therefore, the effective area of the diaphragm responsive to fluid pressure will be reduced by an amount corresponding to the annular area of ring 120. Even though the pressure range of $P_D$ has been raised, a diaphragm spring 96 suitable for use at lower pressures can be used if combined with the reducer ring 120.

Thus, this invention permits the sale of an economical and versatile field regulator which may be quickly adapted to varying service conditions. The regulator disclosed has a substantially increased outlet pressure range of up to 400 p.s.i. and a substantially increased capacity of up to 105,000 cu. ft. per hr. as compared with regulators specifically designed for lower pressures and volumes. The novel combination of interchangeable orifice members, springs, and reducing ring with the mechanical linkage disclosed, provides a fluid pressure regulator which is sensitive throughout all its operable ranges.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a pressure regulator, a casing enclosing a pressure chamber and having at opposite sides inlet and outlet passages, means defining a valve seat in said inlet passage, a support member rigidly but readily removably mounted on the wall of said casing within the chamber between said passages and adjacent said valve seat, a valve member having a head adapted to engage said seat and a stem slidably mounted on said support member and normally spring biased toward open position, a spring biased flexible diaphragm in an apertured wall of said body opposite and in overlying relationship to said support member, biased inwardly of said chamber, a lever pivoted on said support member and operatively slidably connected at opposite ends to said diaphragm and said valve; the subassembly of said support member, said spring biased valve member and said lever being sufficiently smaller than the aperture of said opposite body wall that said sub-assembly can be inserted into or removed from said chamber through the aperture of said opposite body wall after removal of said diaphragm without disassembly of said sub-assembly.

2. In subcombination for a fluid pressure regulator, a rigid support member, a valve having a stem reciprocably mounted on said support member, a bell crank pivoted on said support member, the axis of said pivot being at right angles to the direction of reciprocation of said valve stem, a spring on said support member biasing said valve stem toward an arm of said bell crank, the other arm of said bell crank extending across the top of said support member generally parallel to said valve stem, and means on the bottom of said support member adapting the entire subcombination for mounting in place as a unit in a fluid pressure regulator.

3. The subcombination defined in claim 2 wherein said support member is formed with spaced arms providing bearing mounts for said valve stem, and said support member has spaced ears extending above one of said arms for pivoting said bell crank in association with said valve stem.

4. For use in a pressure regulator having a chambered body provided with a metering orifice inlet and an outlet and an inwardly spring biased stem equipped pressure controlled diaphragm closing an open side of the body chamber, a unitary diaphragm stem movement actuated metering orifice control linkage assembly comprising a rigid support having at least one flat apertured mounting surface on the bottom thereof, a valve disc reciprocably mounted on said support and a motion transmitting means mounted solely on said support and having an input portion responsive to an input thrust force in one direction for imparting movement to said valve in a path normal to said one direction, and resilient means on said support biasing said motion transmitting means in opposition to such a thrust force.

5. In a fluid pressure regulating device comprising a first casing member having opposed inlet and outlet ports and an open-sided internal chamber in fluid communication with both of said ports and having a flexible diaphragm mounted over the opening, a metering orifice mounted in said inlet port, a support member in said chamber smaller than said opening in said internal chamber, a valve assembly mounted on said support member in said chamber comprising a longitudinally slidable valve stem, a valve member and an abutment mounted on opposite ends of said stem, a coil spring surrounding said stem abutting the support member at one end and the abutment at the other so as to bias the valve away from the metering orifice, a bell crank pivotally supported on said support member adjacent the valve stem having a short leg in operative engagement with the end of the valve stem adjacent said valve stem abutment, a second casing member vented to the atmosphere mounted over and securing the diaphragm in the opening in said first casing member, said second casing member containing means cooperating with pressure response of the diaphragm to open and close the metering orifice, said means comprising an adjustably mounted compression spring regulating the pressure sensitivity of the device by an operative biasing connection to said diaphragm, and a diaphragm stem connected at one end to the diaphragm and having at its other end a slide pivot connection with the other leg of said bell crank.

6. In the device defined in claim 5, said slide pivot connection comprising a pin on said stem slidably engaged with the underside of the other leg of said bell crank.

References Cited in the file of this patent

UNITED STATES PATENTS

| 905,187 | Hulse | Dec. 1, 1908 |
| 1,104,865 | Barrington | July 28, 1914 |
| 1,611,263 | Bihl | Dec. 21, 1926 |
| 1,863,075 | Terry | June 14, 1932 |
| 2,482,223 | Strid | Sept. 20, 1949 |
| 2,628,454 | Mueller | Feb. 17, 1953 |

FOREIGN PATENTS

| 112,548 | Great Britain | Jan. 17, 1918 |
| 823,406 | France | Oct. 18, 1937 |